3,773,715
FLAME RETARDANT LINEAR POLYESTERS
Theodore Largman, Morristown, Herman Stone, Convent Station, and Paul J. Koch, Mount Freedom, N.J., assignors to Allied Chemical Corporation, New York, N.Y.
No Drawing. Filed Mar. 1, 1972, Ser. No. 230,962
Int. Cl. C08g 51/58
U.S. Cl. 260—45.85 R          11 Claims

ABSTRACT OF THE DISCLOSURE

Certain halogenated aromatic esters and trisubstituted phosphate esters in combination impart flame retardance to linear polyesters.

This invention relates to flame retardant linear polyester compositions. More particularly, this invention relates to linear polyesters made flame retardant by the addition of certain halogenated aromatic esters and certain trisubstituted phosphate compounds.

BACKGROUND OF THE INVENTION

Recent increasing public awareness and demand for safety of commercial products has led to new legislation requiring many types of plastic products, such as synthetic fibers, building materials and molded articles, to be flame retardant. This in turn, has given new impetus to researchers to discover improved flame retardant additives for polymers which will meet these higher standards.

Numerous flame retardant additives for various polymers are known, generally halogen-containing compounds or organic phosphate compounds which have been found to impart some degree of flame retardance to polymers including polyepoxides, unsaturated polyesters and polyurethanes. However, known fire retardant additives have been less than satisfactroy when added to linear polyesters, either due to lack of effectiveness or because they cause degradation of the polymer during processing.

SUMMARY OF THE INVENTION

It is an object of the present invention to provide flame retardant linear polyester compositions.

It is another object to provide flame retardant linear polyester compositions which do not degrade during processing.

Further objects will become apparent from the following detailed description thereof.

It has been discovered that certain halogenated aromatic esters in combination with certain tri-substituted phosphate compounds, when added in effective amounts, impart flame retardance to linear polyesters. These flame retardant linear polyester compositions can be processed under conventional conditions to give commercial products having good physical properties.

DETAILED DESCRIPTION OF THE INVENTION

The flame retardant compositions of the invention can contain from about 1 to about 15% by weight of the linear polyester of a halogenated aromatic ester and from about 1 to about 10% by weight of the linear polyester of a tri-substituted phosphate compound, as hereinafter described.

The halogenated aromatic esters useful in the present flame retardant linear polyester compositions have the formula (1) 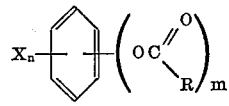

wherein R is a lower alkyl group of 1 to 5 carbon atoms, X is chlorine or bromine, $n$ is an integer from 1 to 5, and $m$ is an integer of 1 or 2;

(2) 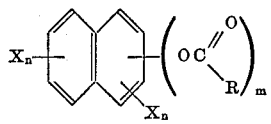

wherein R, X, $m$ and $n$ have the meanings given above; or (3) 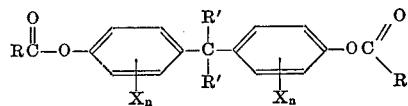

wherein R, X, and $n$ have the meanings given above and R' at each occurrence independently is selected from the group consisting of hydrogen, methyl, or $CX_3$ wherein X has the aforesaid meaning. Compounds wherein R and R' are methyl, and X is bromine are preferred for use in the invention.

Representative halogenated aromatic esters contemplated for use in the invention include 2,4,6-tribromophenol acetate,
pentabromophenol acetate,
pentachlorophenol acetate,
tetrabromohydroquinone diacetate,
tetrabromocatechol diacetate,
tetrabromoresorcinol diacetate,
tetrachlorohydroquinone diacetate,
bis(3,5-dibromo-4-acetophenyl)dimethylmethane,
bis(3,5-dibromo-4-acetophenyl)ditrichloromethylmethane,
bis(3,5-dibromo-4-acetophenyl)methane,
bis(2,3,5,6-tetrabromo-4-acetophenyl)dimethylmethane,
bis(3,5-dichloro-4-acetophenyl)dimethylmethane,
bis(3,5-dibromo-4-propanoatophenyl)dimethylmethane,
and the like.

The tri-substituted phosphate compounds suitable for use in the invention have the formula

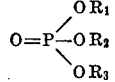

wherein $R_1$, $R_2$, and $R_3$, which can be the same or different, can be an aromatic hydrocarbon or substituted aromatic hydrocarbon radical consisting of aryl, alkaryl and aralkyl. One of $R_1$, $R_2$, and $R_3$ can be an aliphatic radical.

Illustrative of suitable phosphate compounds are triphenyl phosphate, cresyldiphenyl phosphate, tricresyl phosphate, 2-ethylhexyl diphenyl phosphate, trinaphthyl phosphate, 3,5 - dioctadecylnaphthylphosphate, tritolyl phosphate, octyl diphenyl phosphate, and the like.

The linear polyesters which can be made fire retardant by the additives hereinabove described are linear polymers having recurring

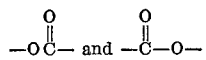

groups—derived from the condensation of dicarboxylic acids or their corresponding esters and diols. Such polyesters include for example, polyethylene terephthalate, polybutylene terephthalate, polyhydroxyethylbenzoic acid, and the like. Polyethylene terephthalate is readily available in various grades for example, as for molding, spinning and the like. In addition to homopolymers, polyesters containing minor amounts of other monomers, such as cyclohexnae dimethanol, isophthalic acid and the like, are intended to be included within the scope of the term linear polyester according to the invention.

The halogenated aromatic ester and tri-substituted phosphate as hereinabove describde, are added to a linear polyester as hereinabove described in amounts effective to impart flame retardance. A large excess of the additives is to be avoided, however, to prevent excessive degradation of the polymer's physical properties. The manner of incorporating the additives into the polymer is not critical. The flame retardant additives can be blended with linear polyester particles or pellets prior to forming operations, or can be added directly to the molten polymer during extrusion, spinning and the like.

As is known to one skilled in the art, linear polyesters can also contain heat and light stabilizers, mold lubricants, terminating agents, nucleating agents, delusterants, pigments, and dyes, fillers and the like in effective amounts.

The invention will be further illustrated by the following examples, but it is to be understood that the invention is not meant to be limited to the details described therein.

In the examples, parts and percentages are by weight. The Limiting Oxygen Index test (hereinafter LOI) is carried out according to the procedure given in ASTM–D–2863.

EXAMPLE 1

Pellets of polyethylene terephthalate having a reduced viscosity of 0.65 and a density of 1.39 were ground to 35 mesh particle size, dried and charged to an extruder along with 5.9% of the polyethylene terephthalate of bis-(3,5-dibromo-4-acetophenyl)-dimethylmethane and 5.2% of the polyethylene terephthalate of triphenyl phosphate. The LOI was 31.4.

A control polyethylene terephthalate as above, but containing no additives had an LOI of 27.5.

As a comparison, an additional run was made adding only the bis(3,5-dibromo - 4 - acetophenyl)dimethylmethane. The LOI was only 29.4.

EXAMPLES 2–5

The procedure of Example 1 was followed except substituting various other halogenated additives of the invention for bis(3,5-dibromo-4-acetophenyl)dimethylmethane. Results are summarized below:

| Example | Additive | Amount of additive [1] | LOI |
| --- | --- | --- | --- |
| 2 | Pentabromophenol acetate | 3.5 | 34.4 |
| 3 | Tetrabromocatechol diacetate | 3.6 | 37.3 |
| 4 | Tetrabromohydroquinone diacetate | 4.8 | 34.2 |
| 5 | 4,4'-bis(2,3,5,6-tetrabromophenol)sulfonyl diacetate | 6.1 | 36.2 |

[1] Percent, based on polyester.

EXAMPLE 6

The procedure of Example 1 was followed except substituting a polybutylene terephthalate of similar molecular weight for the polyethylene terephthalate.

The LOI was 32.2.

What is claimed is:

1. A flame retardant composition comprising a linear polyester selected from the group consisting of polyethylene terephthalate, polybutylene terephthalate and polyhydroxyethylbenzoic acid and effective amounts of a halogenated aromatic ester selected from the group having the

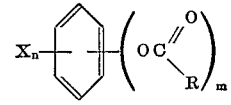

wherein R is a lower alkyl group of 1 to 5 carbon atoms; X is chlorine or bromine; $n$ is an integer of from 1 to 5; and $m$ is an integer of 1 or 2;

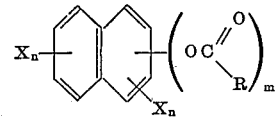

wherein R, X, $m$ and $n$ have the meanings given above; and

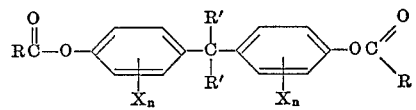

wherein R, X and $n$ have the meanings given above and R' at each occurrence independently is selected from the group consisting of hydrogen, methyl or $CX_3$ wherein X has the meaning given above; and a tri-substituted phosphate having the formula

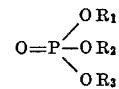

wherein $R_1$, $R_2$ and $R_3$ independently are hydrocarbon radicals selected from the group consisting of alkyl, aryl, alkaryl or aralkyl with the proviso that only one of $R_1$, $R_2$ and $R_3$ can be alkyl.

2. A composition according to claim 1 wherein the phosphate is triphenyl phosphate.

3. A composition according to claim 1 wherein the ester has the formula

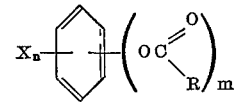

4. A composition according to claim 1 wherein the ester has the formula

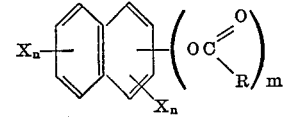

5. A composition according to claim 1 wherein the ester has the formula

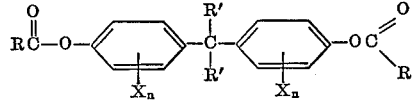

6. A composition according to claim 1 containing from about 1 to about 15% by weight of the linear polyester of the ester.

7. A composition according to claim 1 containing from about 1 to about 10% by weight of the linear polyester of the phosphate compound.

8. A composition according to claim 1 wherein the ester is bis(3,5 - dibromo - 4 - acetophenyl)dimethylmethane and the phosphate compound is triphenyl phosphate.

9. A composition according to claim 1 wherein the linear polyester is polyethylene terephthalate.

10. A composition according to claim 1 wherein the linear polyester is polybutylene terephthalate.

11. A composition according to claim 8 wherein the linear polyester is polyethylene terephthalate.

References Cited

UNITED STATES PATENTS

| | | | |
|---|---|---|---|
| 3,624,024 | 11/1971 | Caldwell et al. | 260—45.75 |
| 3,576,780 | 4/1971 | Jackson | 260—30.6 |
| 3,660,351 | 5/1972 | Schmidt et al. | 260—45.85 |

FOREIGN PATENTS

| | | | |
|---|---|---|---|
| 87,565 | 9/1966 | France | 260—45.85 |

OTHER REFERENCES

The Chemistry and Uses of Fire Retardants, by Lyons Publishers: J. Wiley & Sons, Inc., N.Y., N.Y., 1970, p. 398.

CA, vol. 56, section 15438e.

DONALD E. CZAJA, Primary Examiner

V. P. HOKE, Assistant Examiner

U.S. Cl. X.R.

260—45.7 P

PO-1050
(5/69)

UNITED STATES PATENT OFFICE
CERTIFICATE OF CORRECTION

Patent No. 3,773,715           Dated November 20, 1973

Inventor(s) Theodore Largman, Herman Stone and Paul J. Koch

It is certified that error appears in the above-identified patent and that said Letters Patent are hereby corrected as shown below:

Column 1, line 38, "satisfactroy" should read -- satisfactory --.
Column 3, line 15, "cyclohexnae" should read -- cyclohexane --;
         line 19, "describde" should read -- described --;
         in the Table, under the heading "LOI", "37.3" and
         "34.2" should read -- 37.2 -- and -- 34.3 -- respectively.
Column 4, line 7, after "the", -- formula -- should be inserted.

Signed and sealed this 23rd day of April 1974.

(SEAL)
Attest:

EDWARD M.FLETCHER,JR.                    C. MARSHALL DANN
Attesting Officer                        Commissioner of Patents